Patented Nov. 9, 1937

2,098,861

UNITED STATES PATENT OFFICE 2,098,861

NITROGEN CONTAINING ORGANIC COMPOUNDS

Miles A. Dahlen, Wilmington, Del., assignor to E. I. du Pont de Nemours & Company, Wilmington, Del., a corporation of Delaware No Drawing. Application May 1, 1935, Serial No. 19,145

6 Claims. (Cl. 260—54)

This invention relates to new heterocyclic compounds of the furane series, and more particularly refers to furane and tetra-hydro-furane derivatives wherein an imino-containing radical is substituted upon the heterocyclic nucleus.

It is an object of this invention to prepare a new class of chemical compounds. A further object is to produce intermediates which are especially adapted for use in the preparation of water and/or alkali soluble diazoimino compounds. A still further object is to produce heterocyclic derivatives which are of value in the production of fast, uniform colors on textile fibers. A still further object is to produce heterocyclic derivatives which have an imino-containing radical substituted thereon, and which couple with diazotized arylamines through said imino group. Additional objects will become apparent from a consideration of the following description and claims.

These objects are attained according to the herein described invention wherein a furfurylamine is reacted with a halogenated hydrocarbon or hydrocarbon derivative. In a more restricted sense this invention is directed to the products produced by reacting a furfurylamine with a halogenated aliphatic hydrocarbon which is further substituted, particularly a halogenated lower fatty acid. In its preferred embodiment this invention pertains to the reaction products of alpha furfurylamine and/or tetra-hydro-alpha furfurylamine with sodium chloracetate.

The invention may be more readily understood by a consideration of the following illustrative examples in which the quantities are stated in parts by weight:

Example 1

*Furfuryl-amino-acetic acid.*—97 parts of furfuryl-amine, obtained by the hydrogenation of furfural in ammonia, are dissolved in a small amount of water and a saturated aqueous solution of 116.5 parts of sodium chloracetate added slowly at room temperature, the mixture being well agitated. 84 parts of sodium bicarbonate are then added and the mixture stirred for 8-10 hours, after which it is warmed to 75° C. for one hour. The unreacted furfuryl-amine may be removed from the solution by extracting with ether, or the mixture may be evaporated and the residue carefully washed free of any excess amine with ether. To obtain the sodium furfuryl-amino acetate free from inorganic by-products, the dry residue may be extracted with ethyl alcohol, in which the product is soluble but the inorganic material is insoluble, and the product recovered by precipitation with ether or by evaporation of the alcohol extract. The product is a white solid, which is readily soluble in water, and may be represented by the following formula:

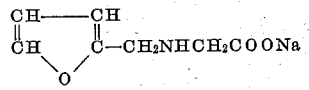

It contains a small amount of the by-product of the formula:

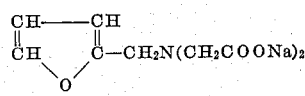

which may be removed by crystallization from ethyl alcohol.

Example 2

*Tetra-hydro-furfuryl-amino-acetic acid.*—101 parts of tetra-hydro-furfuryl-amine, obtained by the hydrogenation of furfuryl-amine, are reacted with 116.5 parts of sodium chloracetate under the same conditions as given in Example 1. The product, which may be isolated in a similar manner, is a white solid, readily soluble in water, and has the following formula:

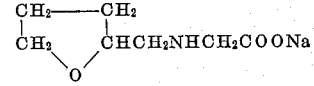

It contains a small amount of the by-product of the formula:

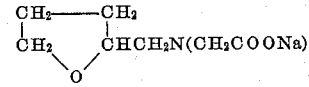

which may be removed by crystallizing the product from ethyl alcohol.

By the addition of an excess of an acid, such as hydrochloric acid, to the product, it is converted to the corresponding acid salt. The latter may be isolated by crystallization or evaporation, and purified by crystallization from water or organic solvents. The hydrochloride has the following structure:

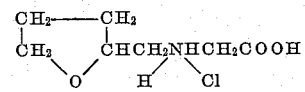

It is to be understood that the aforementioned examples are representative merely of one of the several methods of producing the described products. The individual components, proportions thereof and conditions of reaction may be varied widely without departing from the scope of the invention.

In place of the furane derivatives described in said examples it is to be understood that other furane derivatives might be utilized. These derivatives may be produced by substituting an aminated hydrocarbon, particularly an alkylamine upon furane or its partially or completely hydrogenated derivatives. The manner of producing these alkylamine derivatives will be more fully described hereafter. The position on the furane nucleus where the alkylamine radical is substituted may be varied although it is ordinarily preferable to produce the alpha derivative. Moreover, other radicals may be substituted on the heterocyclic nucleus in addition to the aforementioned alkylamine. Where these heterocyclic compounds are to be used in the production of diazoimino compounds it is, as previously mentioned, advisable to have coupling take place through the external imino group. Consequently, in such cases, care should be taken that substituents are not added to other portions of the heterocyclic nucleus which interfere with this coupling. Since products containing an alpha furyl or alpha tetra-hydro-furyl nucleus are preferred the following instruction will be particularly directed thereto.

In order to produce such products it is usually advisable to start with furfuryl-amine or tetra-hydro-furfuryl-amine. The aforementioned amines may be reacted with a halogenated hydrocarbon, preferably a halogenated aliphatic hydrocarbon. Where the resulting heterocyclic derivatives are to be used in the production of diazoimino compounds it is, in general, advisable to have at least one water-solubilizing group substituted upon the halogenated aliphatic hydrocarbon. Water-solubilizing substituents which have been found to be particularly efficacious are carboxylic acid and sulfonic acid groups, although other solubilizing groups such as sulfinic acids and sulfato and hydroxyl groups may be used in place thereof or in addition thereto. The particular solubilizing group or groups and the number of these groups utilized will depend to a great extent upon the use which is to be made of the resulting compound. Moreover, one or more of these solubilizing groups may be substituted on other portions of the heterocyclic nucleus.

Halogenated aliphatic hydrocarbons which are particularly adapted for use herein are those derived from lower fatty acids. These acids are, for example, acetic, propionic, butyric and the like. In place of hydrocarbons containing the aforementioned carboxyl groups it is possible to substitute therefor hydrocarbons containing the sulfonic acid or related solubilizing group or groups. Likewise, instead of the water-solubilizing group being at the extremity of the hydrocarbon chain it is contemplated that such group may occupy an intermediate position on the hydrocarbon chain. Since halogenated lower fatty acids and in particular the chlorinated lower fatty acids are generally preferable the mechanism of the reaction will be illustrated by reference to chloracetic acid, which reaction is as follows:

$RCH_2NH_2 + ClCH_2-COONa + NaOH \rightarrow$
$RCH_2NHCH_2COONa + NaCl + H_2O$

In the above formula R is generally an alpha furyl or alpha tetra-hydro furyl nucleus. Any unreacted amine may be removed from the solution by extraction with a suitable organic solvent, or the reaction mixture may be evaporated to dryness and the excess amine removed by washing with a solvent, such as ether, in which the free amine is soluble but the reaction product insoluble. If it is desired to obtain the product free from inorganic by-products, the dry residue may be extracted with a suitable organic solvent, such as ethyl alcohol, in which the inorganic material is insoluble. The imino-containing alpha furyl or alpha tetra-hydro furyl compound may then be precipitated by the addition of ether to the alcohol extract.

Products obtained in accordance with the above procedure may contain small amounts of by-products, particularly the tertiary amino acids of the general formula:

$$RCH_2N(CH_2COONa)_2$$

These by-products are produced by the action of 2 moles of sodium chloracetate on 1 mole of furfuryl- or tetra-hydro-furfuryl-amine. The presence of these by-products in the reaction mixture ordinarily does not interfere with their use in the manufacture of water-soluble diazoimino compounds. If it is desired to remove such by-products, this may be accomplished, as previously mentioned, by crystallization from suitable solvents, particularly water, alcohol and the like.

In accordance with the above instructions the new products may be obtained in the form of their sodium or other metal salts. The free acids may be produced therefrom by acidifying these salts to the isoelectric points of the free acids, then isolating these products by crystallization or evaporation.

In place of sodium hydroxide as an acid binding agent other agents having acid binding properties may be used. These agents are well known and may be represented by salts such as sodium carbonate, sodium bicarbonate, sodium acetate, etc., as well as other soluble alkaline salts of the aforementioned acids.

Other chlorinated lower fatty acids may be substituted for the sodium chloracetate described previously. Likewise, the brominated derivatives of such acids may be substituted therefor or used in admixture therewith.

Many of the products described herein may be represented by the following general formula:

$$R-CH_2NH-X$$

wherein R represents a furyl or tetra-hydro furyl nucleus and X represents the residue of an aliphatic hydrocarbon. In the preferred embodiment R represents the residue of furane or tetra-hydro furane and X represents the residue of a lower fatty acid or a soluble salt thereof. The aforesaid compounds may be coupled with diazotized aromatic amines to produce water soluble diazoimino compounds having the following general formula:

$$Aryl-N=N-N\begin{matrix}R_1\\R_2\end{matrix}$$

wherein aryl represents an aromatic nucleus which may have substituted thereon non-water-solubilizing groups, $R_1$ represents an alkyl, carbocyclyl, carbo-cyclyl-alkyl, hetero-cyclyl or hetero-cyclyl-alkyl radical, and $R_2$ represents a hetero-cyclyl or hetero-cyclyl-alkyl radical, and wherein $R_1$ and/or $R_2$ contains one or more water-solubilizing groups.

The above described diazoimino compounds may be used for a variety of purposes, chief among which is the production of ice colors. In the production of ice colors these compounds are mixed with approximately equivalent quantities of ice color coupling components. Textile fibers may then be impregnated with alkaline pastes containing such mixtures, the color being developed thereon by subjecting these fibers to the action of heat and mild acids, such as acetic or formic acids. Under these hydrolyzing conditions the diazoimino compound reverts to the parent diazo salt and the latter couples with the ice color coupling component thereby dyeing the impregnated fibers. Among the ice color coupling components which have been found to be particularly suitable for use in combination with the products of this invention are the following:

1. Arylamides of 2-3-hydroxy-naphthoic acid and other hydroxy-aryl-carboxylic acids.
2. Acyl-acetyl derivatives of arylamines.
3. Alpha and beta-naphthol.
4. Aryl-alkyl pyrazolones.
5. Dihydroxy-quinolines.

A typical mixture of one of the diazoimino compounds described herein and a well known ice color coupling component is:

52 parts of the diazoimino compound corresponding to the formula given in Example 2.
48 parts of the ortho-toluidide of 2-3-hydroxy-naphthoic acid.

When cotton piece goods are printed with a paste containing the above mixture, then developed in the usual manner, the pattern is produced as a bright red dye of excellent fastness properties.

By means of the present invention a new class of nitrogen-containing compounds having a wide variety of uses is obtained. These compounds are readily available and may be produced at a very reasonable cost. They are of particular value in the production of diazoimino compounds for use in ice color dyeing and printing processes. Unlike the diazoimino stabilizing agents previously known, they contain a heterocyclic nucleus which is incapable of coupling directly with a diazotized arylamine or tetrazotized arylene diamine.

The utility of the aforesaid compounds in ice color dyeing and printing processes is brought out in considerable detail in copending applications Serial Nos. 14,270 and 14,271, both filed April 2, 1935.

As many apparently widely different embodiments of this invention may be made without departing from the spirit and scope thereof, it is to be understood that the invention is not limited to the specific embodiments thereof except as defined in the appended claims.

I claim:

1. A process for producing heterocyclic compounds of the furane series which comprises reacting in the presence of an acid-binding substance a member of the group consisting of furfuryl and hydrofurfuryl amines with a saturated aliphatic acid of 2-4 carbon atoms having one hydrogen attached to carbon replaced by halogen.

2. A process for producing heterocyclic compounds of the furane series which comprises reacting in the presence of an acid-binding substance a furfuryl-amine with a saturated aliphatic acid of 2-4 carbon atoms having one hydrogen attached to carbon replaced by halogen.

3. A process for producing heterocyclic compounds of the furane series which comprises reacting in the presence of an acid-binding substance a hydro-furfuryl amine with a saturated aliphatic acid of 2-4 carbon atoms having one hydrogen attached to carbon replaced by halogen.

4. Heterocyclic compounds of the furane series having the following general formula:

R—CH₂NH—R'—COO—X wherein R is a radical of the group consisting of furyl and hydrofuryl, R' is a saturated aliphatic hydrocarbon radical of 1-3 carbon atoms and X is a member of the group consisting of hydrogen and the alkali metals.

5. Heterocyclic compounds of the furane series having the following general formula:

R—CH₂NH—R'—COO—X wherein R is furyl, R' is a saturated aliphatic hydrocarbon radical of 1-3 carbon atoms and X is a member of the group consisting of hydrogen and the alkali metals.

6. Heterocyclic compounds of the furane series having the following general formula:

R—CH₂NH—R'—COO—X wherein R is a hydrofuryl radical, R' is a saturated aliphatic hydrocarbon radical of 1-3 carbon atoms and X is a member of the group consisting of hydrogen and the alkali metals.

MILES A. DAHLEN.